United States Patent
Hidding et al.

[11] Patent Number: 5,904,255
[45] Date of Patent: May 18, 1999

[54] APPARATUS AND METHOD FOR SORTING OBJECTS

[75] Inventors: Gerhard Hidding, De Heerenveen; Rocus Johanne van Oosten, Groningen; Jeichienus Adriaan van der Werff, Montfoort, all of Netherlands

[73] Assignee: Hadewe B.V., Drachten, Netherlands

[21] Appl. No.: 08/705,821

[22] Filed: Aug. 30, 1996

[51] Int. Cl.⁶ .................................................... B07C 5/00
[52] U.S. Cl. ................................................ 209/584; 209/900
[58] Field of Search .................................... 209/584, 583, 209/587, 900, 933

[56] References Cited

U.S. PATENT DOCUMENTS

| | | |
|---|---|---|
| 4,388,994 | 6/1983 | Suda et al. . |
| 5,009,321 | 4/1991 | Keough . |
| 5,042,667 | 8/1991 | Keough . |
| 5,112,042 | 5/1992 | Tilles et al. . |
| 5,143,225 | 9/1992 | Rabindran et al. . |
| 5,363,971 | 11/1994 | Weeks et al. . |
| 5,433,325 | 7/1995 | Levaro et al. ......................... 209/584 |

FOREIGN PATENT DOCUMENTS

| | | |
|---|---|---|
| 0 429 118 | 5/1991 | European Pat. Off. . |
| 1 277 606 | 9/1968 | Germany . |

*Primary Examiner*—David H. Bollinger
*Attorney, Agent, or Firm*—Burns, Doane, Swecker & Mathis, L.L.P.

[57] ABSTRACT

Apparatus, method and modules for sorting flat objects. The apparatus comprises a number of sorting holders, a conveying system with a switch and branches connecting thereto, a reading unit, and an object separator for feeding, one by one, stacked objects to the conveying system for recirculation. Because in operation, during the feed from the sorting holders, the objects are separated and individually recirculated from the sorting holders to the switch, this can be controlled in a simple manner and carried out with simple, compact conveying means. The apparatus can be modularly constructed from a basic module with a sorting holder and one or more sorting modules also with a sorting holder and a recirculation path.

15 Claims, 2 Drawing Sheets

APPARATUS AND METHOD FOR SORTING OBJECTS

FIELD AND BACKGROUND OF THE INVENTION

The invention relates to an apparatus for sorting substantially flat objects, such as mail items and documents. Such apparatus are provided with two or more sorting holders for storing objects stackwise in a stacking direction, a conveying system for conveying objects with at least one switch and at least two branches of the conveying system that connect thereto downstream, a reading unit for reading information from objects to be sorted, a processor connected with the reading unit for processing signals received from that reading unit and connected with the switch for operating the switch, and feed means for transporting objects from at least one of the sorting holders to a portion of the conveying system upstream of the switch.

Sorting flat objects, such as mail items and documents, by means of such apparatus, generally comprises the following operations: reading information from objects to be sorted, determining for each object a sorting indication on the basis of the information read from the relevant object, a first sorting operation wherein for each object one of at least two sorting holders is selected depending on the sorting indication of the relevant object and the objects are each conveyed to the sorting holder selected therefor and stacked in the sorting holders in a stacking direction, always in a position transverse to the stacking direction, and at least one further sorting operation, wherein at least a number of the objects are taken out of the sorting holders again, a sorting holder is selected for each object again and the objects are each conveyed to the sorting holder selected therefor and stacked in the sorting holders in a stacking direction, always in a position transverse to the stacking direction.

Such an apparatus and such a method are known from U.S. Pat. No. 5,112,042. Further, the invention relates to modules for composing an apparatus according to a special embodiment of the invention.

In U.S. Pat. No. 5,009,321, a system is described wherein, for mechanically sorting relatively small numbers of objects over a relatively large number of sorting positions (for instance addresses), a sorting algorithm with several sorting operations is utilized. According to the example, mail items for an area of 400 addresses are sorted by sorting a batch of objects to be sorted twice in succession over 20 pockets. A drawback of this system is that after the first sorting operation, the objects should be removed from the sorting pockets and deposited into the system in the correct order by the operator.

U.S. Pat. No. 5,112,042, cited hereinabove, describes a sorting machine of which sorting holders are adapted to store objects stackwise. The sorting holders comprise slides and stops whereby the objects can be removed in clusters from the sorting holders. The slides are movable to and fro in stacking direction and can moreover be swivelled between a position in alignment with objects in the sorting holder and a position beside the objects stacked in the sorting holder. For again feeding clusters of objects removed from the sorting holders, this sorting machine comprises a recirculation holder or several recirculation holders. The or each recirculation holder is displaceable between a position in alignment with one of the sorting holders and a position in alignment with the feed path to the reading unit.

Drawbacks of this system are that the construction with slides, stops and a recirculation holder or several recirculation holders is complicated and costly, and that displacement of the clusters of objects involves a relatively great chance of problems, because as a rule, a stack of incoming mail is highly irregular, as a result of which objects can easily be "squeezed from the stacks".

According to U.S. Pat. No. 5,143,225, the problems inherent in displacing clusters of objects are overcome by providing an apparatus with sorting pockets in the form of double conveyor belts, where between the objects can be retained in the manner of roof tiles. The apparatus comprises a first set of these sorting pockets for carrying out a first sorting operation. During the second sorting operation, the objects are fed from the first set of sorting pockets and conveyed to a second set of sorting pockets. However, the construction of this apparatus is also complicated, costly and voluminous, in that it comprises a large number of sorting holders in the form of very long double belts.

U.S. Pat. No. 5,042,667 also describes an apparatus having a first set of holders and a second set of holders. The first set of holders is constructed as a circuitous conveyor with positions for all objects to be sorted. The second set of holders is constructed as a smaller number of pockets to which objects fed from the first set of holders can be moved. The objects in the first set of holders move along an output position. When an object for the output position is next in turn for being received in one of the holders of the second set, it is removed from the first set of holders and conveyed to the selected holder of the second set of holders. This apparatus is complicated, costly and voluminous as well, particularly because the first set of holders is constructed as a circuitous path with positions for all objects to be sorted.

European patent application 0 429 118 discloses a sorting system comprising buffer pockets for storing and delivering individual objects. The objects delivered are discharged so that they will not automatically be fed for passing through a second sorting operation. Moreover, this apparatus is of course also complicated, costly and voluminous, because of the holders that are each designed for temporarily storing one object, a very large number are required in order to obtain a more or less effective apparatus. There is described an embodiment having 12 buffers, each consisting of 64 holders, i.e. 768 holders in total.

Consequently, the drawback inherent in each of these apparatus having sorting holders that can be emptied mechanically is that these apparatus are highly complicated and costly and take up much space.

SUMMARY OF THE INVENTION

It is an object of the invention to provide an apparatus which is constructed in a considerably simpler manner and which can hence be manufactured at lowers costs, and which occupies less space, and to provide a method for the performance of which such simple apparatus suffices.

In accordance with the present invention, this object is realized by providing the feed means in a sorting apparatus of the above-described type with an object separator for separating stacked objects and feeding them one by one.

The invention further provides a method which can be carried out particularly advantageously with an apparatus according to the invention, in that in a method of the above-described type, at least during the further sorting operation, the objects stacked in the sorting holders are separated and individually recirculated from the sorting holders.

When the invention is used, the objects to be sorted can, from a simple and compact storage configuration, be easily recirculated continuously for passing through a next sorting operation. Hence, apart from the sorting holders, the conveying means for recirculating the objects can also be of compact design. Further, no separate provisions are necessary for removing clusters of objects from the sorting holders. Instead, the sorting holders comprise object separators which can be of a relatively simple construction. Further, no object separator is necessary between the sorting holders and the reading unit, which further contributes to simplifying the construction.

In fact, the steps of sweeping the sorting holders and separating fed objects have been integrated into one single step, of separating objects directly from the sorting holders. Hence, in addition to the objects present in the sorting holders, constantly only a limited number of individual objects are being treated, which is relatively simple to control.

A particular advantage of the method and the apparatus according to the invention is that objects cannot only be selectively fed to a particular sorting holder, but can also be selectively delivered from a particular sorting holder. This enables the use of more advanced sorting programs, which programs, for instance for reading during a first sorting operation, make use of collected data relating to the objects that are being treated and the positions of those objects in the collection.

Another particular advantage of the method and the apparatus according to the invention is that during the first sorting operation, feeding can take place alternately from different sorting holders, so that in each of the sorting holders sufficient space is gradually kept for receiving fed objects.

For optimally dividing space available for receiving objects in the sorting holders, it is also possible during the first sorting operation to deliver an object from a sorting holder each time when a sorted object is fed thereto.

In accordance with a particular embodiment of the invention, is apparatus is of modular construction. In combination with the feed of objects, one by one, from the sorting holders, this can be realized with particular advantage, because causing separate objects to pass from one module to a module connecting thereto is possible in a relatively simple manner. Consequently, the invention can also be embodied in a basic module as defined in claim 8 and in a sorting module as defined in claim 9.

Further advantages and embodiments of the invention appear from the following description in connection with the drawings and from the claims.

DETAILED DESCRIPTION OF THE INVENTION

Figure 1:
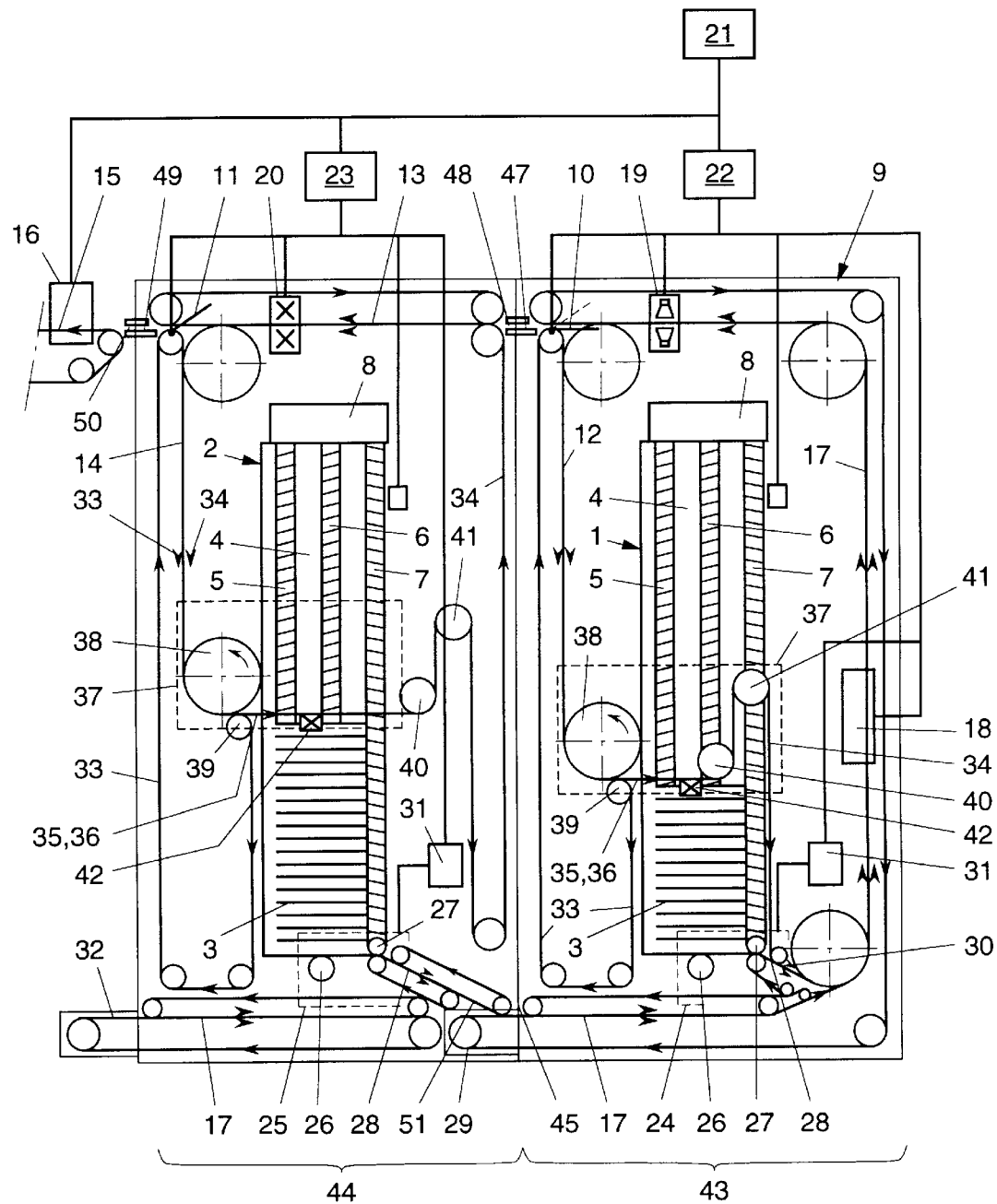
FIG. 1 is a cutaway side elevation at a downward inclined angle of an apparatus according to a first exemplary embodiment of the invention.
Figure 2:
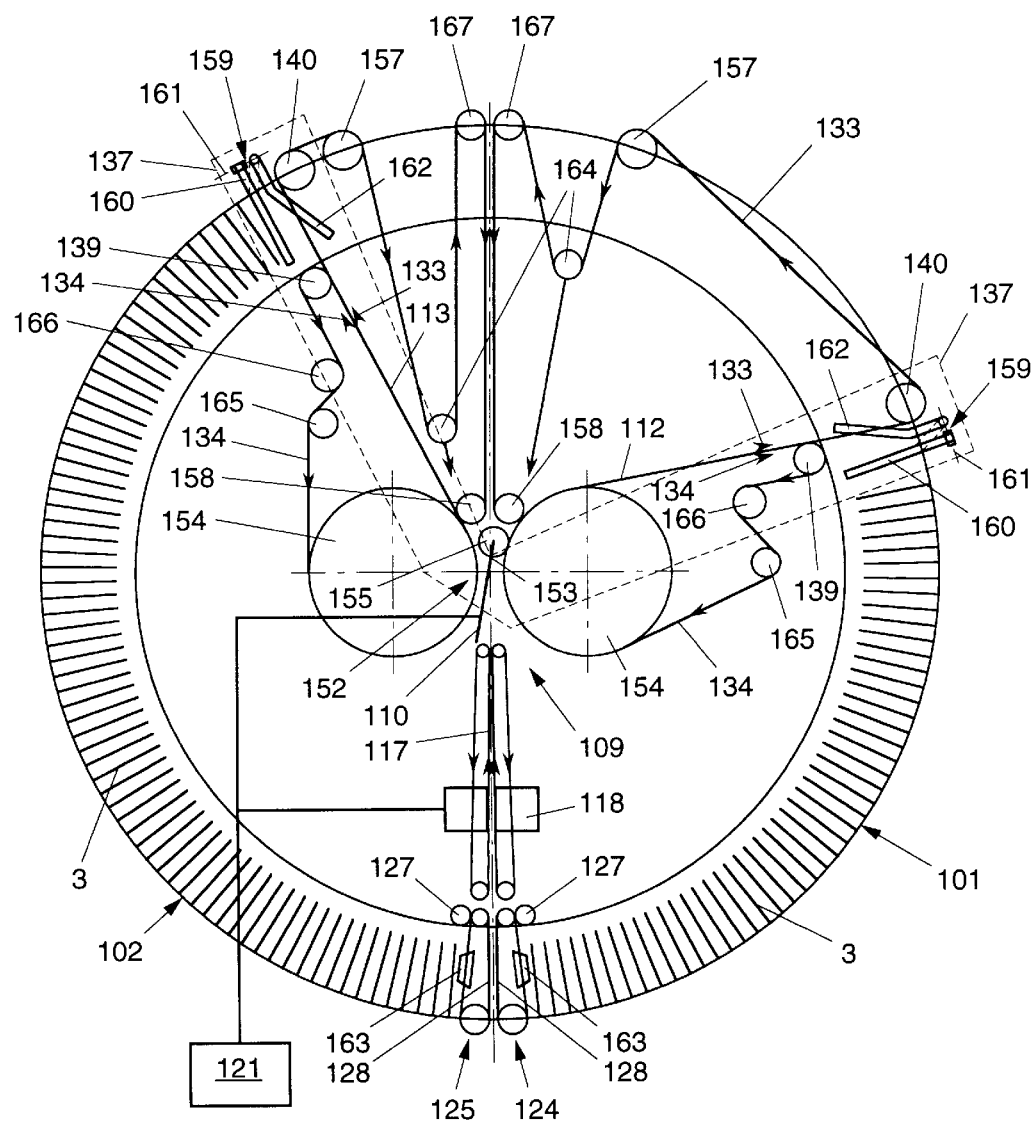
FIG. 2 is a top plan view of an apparatus according to a second exemplary embodiment of the invention.

The invention is in the first instance specified with reference to the example shown in FIG. 1. After that, the exemplary embodiment shown in FIG. 2 is described and explained.

The apparatus shown in FIG. 1 is intended for sorting substantially flat objects, such as mail items and documents, and is in particular suitable for utilizations wherein medium-large amounts of mail items are sorted by means of several sorting operations. Examples of such utilizations are the sorting of mail items according to the route of a mail carrier, the sorting of incoming mail in large organizations and the presorting of outgoing mail, in order to be able to take advantage of discounts applying to batch mailing. In the following description, the invention will be further explained within the context of sorting mail items, which constitutes the most important use, although other objects, such as documents and (reply) cards, can also be sorted thereby.

The apparatus comprises a first sorting holder 1 and a second sorting holder 2 for storing mail items 3 stackwise in a stacking direction. Preferably, the stacking direction is directed at a substantial angle (preferably between 20° and 50°) to the vertical, causing edges on one side of the mail items in the same sorting holder 1, 2, to abut against the same guide 4 through the action of gravity. The mail items can also be stacked in horizontal direction (which in normal parlance is also called "placing in a row"). In that case, it is necesssary to retain the stack on the side where mail items are added. An example of a stack retainer whereby this can be realized is shown in FIG. 2 and will be further described and explained hereinafter. In FIG. 1, the sorting holders 1, 2 and the associated guides 4 incline backwards, causing the mail items 3 to abut against the guides 4 which, in viewing direction, are located at the rear.

The sorting holders 1, 2 each comprise three screw conveyors 5, 6, 7, of which two conveyors 5, 6 are located on the side of the associated guide 4 and have windings that project precisely outside the guide 4. The third conveyor 7 of each sorting holder extends at the side of and before the two other screw conveyors 5, 6, parallel to those other two conveyors 5, 6. The mail items should preferably be placed in the sorting holders 1, 2 in such a manner that the long sides face the first two screw conveyors 5, 6, the short sides face the third screw conveyor 7, and the side containing address or sorting information faces upwards. In operation, the screw conveyors 5, 6, 7 are driven by a driving unit 8, the first two screw conveyors 5, 6 being driven so that the circumferential portions that contact mail items 3 move in the direction of the side where the third screw conveyor 7 is located. As a result, the mail items are urged towards the third screw conveyors 7, so that the short sides of the mail items 3 are aligned on the side of the third screw conveyor 7.

The apparatus further comprises a conveying system 9 for conveying mail items 3. The conveying system 9 is built up from circuitous belts, the conveying paths always being formed by double belt ends between which the mail items 3 are retained during conveyance. In the drawing, some belt ends and the direction of travel thereof are in each case indicated by single arrows, and double belt ends between which the mail items can be retained and conveyed and the direction of travel thereof are indicated by double arrows.

The conveying system 9 comprises a first switch 10 and a second switch 11. To each of the switches, two branches 12, 13 and 14, 49 respectively of the conveying system 9 are connected, downstream thereof. A first branch 12 extends downwards from the first switch 10 to the first sorting holder 1. A second branch 13 extends approximately horizontally from the first switch 10 to the second switch 11. A third branch 14 extends downwards from the second switch 11 to the second sorting holder 2. A fourth branch 49 extends approximately horizontally from the second switch 10 away from the apparatus to connect to discharge path 15, on which sorted mail items can be discharged. It is observed that a construction without discharge path 15 is also possible. In that construction, the sorted mail items are received in the sorting holders 1, 2, from which they can be removed manually.

Provided along the discharge path 15 is a discharge-separator 16, adapted to displace passing mail items laterally. By displacing mail items intended for successive addresses, starts or route portions alternately to the left and to the right, or alternately laterally and not laterally, during the stacking of the mail items a stack can be obtained wherein groups of mail items that are to be treated differently can readily be distinguished.

Along a pass-through portion 17 of the conveying system 9, upstream of the first switch 10, a reading unit 18 is provided for reading information from mail items 3 to be sorted. Depending on the intended use, the reading unit can be adapted to read addresses present on the mail items and/or signs provided on the mail items especially for the mechanical processing thereof, such as bar codes.

Along the pass-through portion 17 of the conveying system 9, shortly before the first switch 10, a detector 19 is further provided, to enable observing when a next mail item approaches the switch 10. By registering the number of mail items that leave the reading unit and the number of mail items that have reached the detector 19, when a mail item is observed by the detector it is always known which mail item that is and which mail item will be the next hail item. Optionally, the length and/or another feature of a mail item can be scanned by the detector in order to verify whether a specific mail item detected is indeed the mail item expected. If a number of successive mail items have the same lengths, in the event of a counting error no error will at first be detected upon verification through length detection. In the next succession of mail items of different lengths, the error will be observed, however. If all incoming mail items have the same lengths (as is for instance often the case during the processing of returned reply envelopes or the sorting of outgoing mail) verification through length detection can of course not be practised, but a detector 19 for scanning another feature will have to be employed.

Along the third branch 13, at a short distance upstream of the second switch 11, a second detector 20 is provided having a function similar to that of the first detector 19. Obviously, when mail items arriving at the location of the second detector 20 are counted, mail items that are sent by the first switch 10 to the first sorting holder 1 rather than to the second switch 11 should be left unconsidered.

For controlling the apparatus, it is provided with a central processor 21 which, via a first subprocessor 22, is inter alia connected to the reading unit for processing signals received from that reading unit, and to the first switch 10 for operating that switch. Via a second subprocessor 23, the central processor 21 is further connected to the second switch 11 for operating that switch. By the first subprocessor, the information read from the mail items is transmitted in suitable form to the central processor 21. The central processor 21 comprises a program whereby it is determined in what manner the mail items should be sorted. This depends on the number of sorting holders present in the apparatus and on the fineness of the classification according to which the sorting is to be effected. The commands issued by the central processor 21 to the subprocessors 22, 23—each subprocessor being associated with a sorting holder 1, 2 and a switch 10, 1 respectively—substantially consist of a series of commands which in each case indicate whether a mail item is to be passed on or sent to the associated sorting holder 1, 2. The subprocessors 22, 23 are adapted to monitor themselves which mail items have already passed and which command is therefore applicable to which mail item. For this purpose, the subprocessors 22, 23 are connected to the detectors 19 and 20 respectively.

For transporting mail items from the sorting holders 1, 2 to the portion 17 of the conveying system 9 upstream of the first switch 10, the sorting holders 1, 2 each comprise feed means in the form of a mail item separator 24 and 25 respectively (schematically shown in broken lines as blocks) for separating and delivering stacked mail items 3 one by one. The mail item separators are each constructed as a bottom feed system and are each provided with a feed roller 26, a separating roller 27 and a conveyor belt 28. Disposed opposite the conveyor belt 28 of the mail item separator 25 and connecting to the second sorting holder 2 is a press-on belt 29. A returning belt portion forms a press-on belt 30 opposite the conveyor belt 28 of the separator 24 which forms the outlet of the first sorting holder 1. The mail item separators 24, 25 are each controlled by a control unit 31 connected to the corresponding subprocessor 22, 23.

As the mail items are separately fed, one by one, from a stacked configuration, they can, from a simple and compact storage configuration, easily be recirculated continuously for passing through a following sorting operation via the portion 17 of the conveying system 9 upstream of the first switch 10. For this purpose, this portion 17 only needs to be sufficiently extended in upstream direction for enabling the outlets of the necessary sorting holders to be connected thereto. Hence, apart from the sorting holders, the portion 17 of the conveying means 9 for recirculating the mail items can also be of compact design.

In operation, the apparatus according to FIG. 1 functions as follows. In each case, a mail item is separated and fed individually from one of the sorting holders 1, 2. Via the portion 17, located upstream of the first switch 10, of the conveying system 9, the mail item is passed to the reading unit 18, where information is read from the fed mail item. On the basis of the information read from the relevant mail item and passed on by the subprocessor 22 to the central processor, a sorting indication is determined for the mail item.

During a first sorting operation, these steps are repeated for all mail items 3 disposed in the sorting holders 1 and 2. In each case, for each mail item one of the two sorting holders 1, 2 is selected, depending on the sorting indication of the relevant mail item as determined by the central processor. In accordance with the sorting indications found, as soon as those sorting indications are known, the commands for passing on the mail items or feeding them to the associated sorting holder 1, 2 are sent to the subprocessors 22 and 23. When the mail items reach the switches 10 and optionally 11, they are then lead to a suitable branch 12, 13, 14 or 49, conveyed to the sorting holder 1, 2 selected for that mail item, and stacked in the relevant sorting holders 1, 2.

During one or more following sorting operations, the mail items 3 are taken again while being fed one by one from the sorting holders 1, 2, a sorting holder 1, 2 is again selected for each of the newly fed mail items 3, and the switches 10, 11 are operated so that the fed mail items are each conveyed to the sorting holder selected therefor for the second sorting operation, and the mail items are stacked in the sorting holders.

During the first sorting operation, the second switch 11 can continuously be held in the position leading to the second sorting holder 2. Optionally, mail items belonging to the first group can already be discharged during the first sorting operation. During following sorting operations, mail items belonging to a group can in each case be discharged as soon as it is known that no mail items that, in respect of the sorting order, belong to a preceding group, are present any longer in the apparatus. In this manner, the number of mail items to be recirculated can be limited and the sorting rate can be optimized.

As a matter of fact, during the first sorting operation, the mail items can also be fed from elsewhere, for instance via an inlet 32 of the apparatus where the beginning of the portion 17 of the conveying system 9 upstream of the first switch 10 is located.

As soon as the mail items have been fed from one of the sorting holders 1, 2, they can in each case be individually conveyed and sorted further, without requiring any further processing. Because apart from the mail items present in the sorting holders, continuously only a limited number of individual mail items are being treated, the sorting program can moreover be controlled in a relatively simple manner.

If the sorting process is started from the sorting holders, it is advantageous when during the first sorting operation, a mail item is alternately fed from different sorting holders 1, 2, so that gradually, in each of the sorting holders 1, 2, sufficient space is created for receiving read and sorted mail items.

For optimally dividing space available in the sorting holders for receiving mail items, it is also possible to feed, during the first sorting operation, a mail item from one of the sorting holders 1, 2 each time when a sorted mail item has been fed thereto.

Ends of the branches 12, 14 of the conveying system 9 terminating in the sorting holders 1, 2 are displaceable in stacking direction of the relevant sorting holder 1, 2 relative to the mail item separator 24, 25, or the outlet, of the relevant sorting holder 1, 2.

Thus, mail items can continuously be fed from the sorting holder 1, 2 at a fixed location, without creating problems during adding fed mail items to a stack caused by the fact that variations in degree of filling of the sorting holder occur during sorting. The mail items are in each case delivered at the end of the stack of mail items 3 remote from the outlet of the sorting holder 1, 2, so that no uncontrolled fall to the stack follows. Also, no special provisions are necessary for keeping the receiving end of the stack at a specific point and subsequently bridging the space between the stack and the outlet of the sorting holder.

In the apparatus shown in FIG. 1, the displaceability of the ends of the branches 12, 14 of the conveying system 9, which branches terminate in the sorting holders, is realized in that those branches 12, 14 of the conveying system 9 each comprise conveyor belts 33, 34, each forming a circuitous loop which extends in stacking direction of the associated sorting holder 1, 2 and which has a portion 35, 36 leading to the sorting holder 1, 2. The portion of each of the loops which leads to the sorting holder 1, 2 is displaceable in stacking direction.

For this purpose, a carrier 37 (shown in broken lines) is constructed so as to be displaceable in stacking direction with pulleys 38, 39, 40, 41. The drive and the transmission for displacing the carrier 37 are not shown, but can be constructed in a manner known per se, for instance in the form of a rack construction, a drive with a toothed belt or in the form of a double-acting type of a lift system as described in U.S. Pat. No. 5,007,507, the content of which is inserted herein by reference. In order to be able to determine the position of the carrier 37 relative to the receiving end of the stack of mail items 3 in the relevant sorting holder 1, 2, the carrier 37 comprises a sensor (shown schematically by block 42).

The apparatus shown in FIG. 1 constitutes the smallest configuration of a modular system and comprises a basic module 43 and a sorting module 44.

Accommodated in the basic module 43 are: the reading unit 18, the first sorting holder 1 and a part of the conveying system 9 with a recirculation inlet 45, a recirculation portion 17 of the conveying system 9 connecting to the recirculation inlet 45, the first switch 10, two branches connecting to the first switch—of which one branch 46 (an upstream portion of the second branch 13) leads to a sorting outlet 47 and of which the other branch 12 leads to the sorting holder 1 of the basic module 43—and feed means connecting to the recirculation portion, with the mail item separator 24. Further, the central processor 21 and the subprocessor 22 belonging to the basic module are also accommodated in the basic module.

Accommodated in the sorting module 44 are: the second sorting holder 2, a part of the conveying system 9 with a sorting inlet 48 connecting to the sorting outlet 47 of the basic module 43, the second switch 11, two branches 14, 49 connecting to that second switch 11, a recirculation portion 17 and feed means connecting to the recirculation portion, with the mail item separator 25. Of the branches, one branch 14 leads to the sorting holder 2 of that sorting module 44 and the other one of the branches 49 (the upstream portion of the fourth branch 49) leads to a sorting outlet 50 in a position suitable for cooperation with a sorting inlet 48 of a next, identical sorting holder. The recirculation portion 17 of the conveying system 9 forming part of that sorting module 44 extends between a recirculation inlet 32 and a recirculation outlet. The recirculation inlet 32 is arranged in a position suitable for cooperation with a recirculation outlet 51 of a next, identical sorting module, and the recirculation outlet 51 terminates in the recirculation inlet 51 of the basic module 43. Finally, the subprocessor 23 belonging to the sorting module 44 is accommodated in the sorting module as well.

Owing to the modular construction, the processing rate of the apparatus can easily be adapted to what is considered necessary for the intended use. If the sorting rate is considered insufficient, for instance because of the growth of a post office, the number of sorting holders can be increased, so that fewer sorting operations are necessary for sorting a particular amount of mail items over a particular number of addresses. In the case of a large machine composed of a large number of sorting modules, it may for further extension of the sorting capacity be advantageous to add a basic module and to redistribute the available sorting modules over the available basic modules. Redundant sorting modules can be employed where there is or threatens to be a shortage of sorting capacity. In this manner, a sorting system is obtained which can easily be adapted to the requirements and to changes therein.

As the control system of the apparatus is built up of a main processor and subprocessors that are each part of one of the modules, and the main processor is connected to the subprocessors that are each part of one of the modules for issuing signals which indicate for each mail item fed to the module whether that mail item should be passed on to a next module, the main processor is not charged with the internal control of the modules. As a result, the main processor can be of relatively simple design, and relatively little communication between the main processor and the modules is required. This is in particular advantageous for customers to whom a small sorting apparatus is sufficient, because these customers would otherwise have to rely on a basic module with a large main processor for controlling in detail a large number of modules. In the configuration proposed, the control capacity increases with the addition of sorting modules and the main processor is mainly charged with the logistic control of the sorting process.

Hereinbelow, the exemplary embodiment shown in FIG. 2 is further described and explained. In this apparatus, the sorting holders 101, 102 form concentric sections of a circle for stacking mail items 3 in stacking directions extending along those segments of a circle.

Provided at the facing ends of the sorting holders 101, 102 are mail item separators 124, 125 for separating and delivering mail items from the sorting holders 101, 102. The mail item separators each comprise a feed and conveyor belt 128 and a separation roller 127. Of course, according to the contemplated field of application, other known mail item separators can also be used for separating documents, envelopes and/or mail items.

Connecting to the two mail item separators 124, 125 downstream thereof is a conveying system 109, a first portion 117 of which extends to a switch 110. Provided along the conveying path 117 located upstream of the switch 110 is a reading unit 118 for reading information from mail items passing along the reading unit 118. The reading unit 118 communicates with a processor 121 which on the basis of information received from the reading unit 118 determines what the sorting indication is of the mail item from which that information originates. Next, the processor 121 determines on the basis of the sorting indication and the sorting algorithm employed to which of the sorting holders 101, 102 the mail item is to be conveyed. The processor 121 is also connected to the switch 110 and operates this switch depending on the sorting holder 101, 102 selected for mail items approaching along the conveying path 117.

Connecting to the switch 110 are two branches 112, 113 of the conveying system 109, each branch leading to one of the sorting holders 101, 102. These branches 112, 113 each extend from the central area 152 of the above-mentioned segments of a circle to the relevant sorting holders 101, 102. The branches 112, 113 of the conveying system 109 can be swivelled about the central area. For this purpose, pulleys 139, 140 over which the conveyor belts and/or strings 133, 134 extend and which are radially spaced from the center of the circular segments, are provided on carriers 137 (shown in broken lines) which can be swivelled about a common shaft 153 of the circular segments formed by the sorting holders 101, 102.

By swivelling the carriers 137—and, accordingly, the branches 112, 113—the locations where those branches 112, 113 terminate in the sorting holders 101, 102 are adjusted in the stacking directions extending along the circular segments. Hence, the locations where the branches 112, 113 terminate in the sorting holders 101, 102 can be adapted to the degree of filling of the relevant sorting holder 101, 102, so that the mail items can be added to a row of mail items present in a sorting holder 101, 102 so as to connect precisely to the receiving end of that row.

The upstream ends of each of the branches 112, 113 are formed by a pinch between a central roller 155 provided on an arm of the switch projecting downstream of the central shaft 153 and a pulley 154 of a relatively large diameter. The further path of each of the branches 112, 113 extends between the belts or strings 133, 134. Of these, the belts 133 constitute the boundaries, remote from the mail item separators 124, 125, of the branches 112, 113. These belts extend over upstream pulleys 158 and also over the side of the large-diameter pulleys 154 which faces away from the mail item separators 124, 125. The belts 134 forming the boundaries of the branches 112, 113 which boundaries are located on the side of the mail item separators 124, 125, each extend around one of the pulleys 154 of a relatively large diameter.

In operation, mail items pass from the switch 110, mounted at a fixed position, over the side of the relatively large diameter pulleys 154 facing away from the mail item separators 124, 125, and the conveying direction of the mail items is bent over in the direction of the receiving end of the row of mail items present in the relevant sorting holder 101, 102. When the sorting holder 101, 102 is relatively full, the direction of movement of the mail item is bent over less than when the sorting holder 101, 102 is relatively empty.

The belts 133 on the side of the branches 112, 113 facing away from the mail item separators 124, 125 each have a returning end which extends over a fixed diversion pulley 157. These diversion pulleys 157 are located approximately opposite the mail item separators 124, 125 so as to enable the branches 112, 113 to be swivelled to a location close to a position diametrically spaced from the mail item separators 124, 125N This allows the branches to be swivelled through a large angle and at a given radius of the circular segments, correspondingly large sorting holders 101, 102 can be used. However, the diversion pulleys 157 are also slightly spaced from a central face of the apparatus extending between the mail item separators 124, 125, to prevent the returning ends of the belts 133 from running against the large pulleys 154 when the associated carrier 137 is swivelled towards the associated mail item separator 124, 125, which position is reached when a sorting holder is empty.

During the swivelling of the carriers 137, the distance between the pulleys over which the belts 133, 134 are passed and which distance is to be bridged by these belts, varies. Hence, the belts 133, 134 are passed over yieldingly suspended stretching pulleys 164 and 165, 166 respectively, which keep the tension variation in the belts 133, 134 within certain limits. Moreover, the belts 133 on the side of the branches 112, 113 facing away from the mail item separators 124, 125 each extend around an additional diversion pulley 167.

Opposite downstream ends of the branches 112, 113, the carriers 137 having receiving units 159 are provided, which are hence displaceable together with ends of the branches 112, 113 of the conveying system which terminate in the sorting holders 101, 102. The receiving units 159 each comprise a slide 160 which is not only displaceable along with the carrier 137, but also perpendicularly to the stacking direction through swivelling about a shaft 161. The slides 160 are each displaceable between a first position, projecting into the sorting holder 101, 102, and a second, withdrawn position. Further, the receiving units are each provided with a clamp 162 which is not only displaceable along with the carrier 137, but also in stacking direction between a first position on the side of the slide 160 facing away from the mail item separator 124, 125 and a second position in stacking direction in alignment with the slide 160 or on the side of the slide 160 facing the mail item separator 124, 125.

In operation, the mail items are pressed down in the sorting holders 101, 102 and urged towards the mail item separators 124, 125 by the slides 160 which, by swivelling the carriers 137, are pressed against the receiving sides of the rows of mail items present in the sorting holders 101, 102. As the sorting holders 101, 102 are formed as circular segments and hence the stacking direction extends along those circular segments, the mail items in the sorting holders are also urged radially in outward direction, so that they are automatically aligned along the outer walls of the sorting holders 101, 102. Hence, no guides are necessary along the inner sides of the sorting holders, so that these inner sides can be of open design for letting through mail items from the branches 112, 113.

When, via one of the branches 112, 113, a mail item is fed, it is first brought into a position which, viewed in stacking direction, is located on the side of the slide 160 facing away from the associated mail item separator 124, 125. After that, the slide 160 is displaced towards its second, withdrawn position and the clamp 162 is operated for pressing the received mail item in the direction of the associated mail item separator 124, 125, viewed in stacking direction, until the clamp 162, relative to the slide 160, has been moved to the side of the associated mail item separator 124, 125, viewed in stacking direction. Then, the slide 160 is returned into its position connecting to the receiving side of the stack. Now, viewed in stacking direction, the received mail item has been moved to the side of the mail item separator 124, 125 of the relevant sorting holder 101, 102. Finally, the clamp 162 is swivelled back into its starting position on the side of the slide 160 facing away from the mail item separator 124, 125. The receiving device 159 is now ready to receive a next mail item between the clamp 162 and the slide 160.

Pressing down the row of mail items in the sorting holders 101, 102 is controlled depending on signals coming from sensors 163 at the location of the mail item separators 124, 125. When the pressure exerted on one of the sensors 163 by the end of the row of mail items drops below a particular value, the associated carrier 137 is swivelled towards the mail item separator 124, 125 until the pressure has reached a particular value. When a mail item is added to a sorting holder 101, 102, the carrier is swivelled away from the associated mail item separator 124, 125 through a particular distance in order to provide space for that additional mail item. The mail item is always thinner than the space provided, so that in principle after the addition of each mail item from the associated branch 112, 113, the stack is pressed down again. The pulsating action of pressing down each time again the row of mail items promotes the obtaining of a proper alignment along the outer wall of the sorting holders 101, 102.

To both embodiments it applies that, in operation, the displacements of each mail item to be sorted, after the sorting indication thereof has been determined, are preferably monitored by the data processor 21, 121, so that during the sorting operations, the position of each mail item whose sorting indication has been determined is constantly known.

In addition, information can again be read from mail items on a sample basis. The information read is then compared with the information stored in the data processor 21, 121 regarding the mail item at the location of the reading unit 18, 118.

In both embodiments, the mail items passing through a complete sorting operation are each rotated through an angle of 360° during that sorting operation. As a result, the mail items move along the reading unit 18, 118 always in the same position. This means that if the mail items are fed into the apparatus with their address sides all facing the same direction, the reading unit 18, 118 in each case needs to be operative on one side of the conveying path only.

We claim:

1. An apparatus for sorting substantially flat objects, such as mail items and documents, comprising:
   at least two sorting holders for storing objects stackwise in a stacking direction;
   a conveying system for conveying objects with at least one switch and at least two branches of the conveying system that connect thereto downstream;
   a reading unit for reading information from objects to be sorted;
   a processor connected with the reading unit for processing signals received from said reading unit and connected with the switch for operating the switch; and
   feed means for transporting objects from at least one of the sorting holders to a portion of the conveying system upstream of the switch;
   wherein the feed means comprise an object separator for separating and feeding one by one stacked objects.

2. An apparatus according to claim 1, wherein ends of the branches of the conveying system that terminate in the sorting holders can be displaced in stacking direction of the relevant sorting holder relative to the object separator of the relevant sorting holder.

3. An apparatus according to claim 2, wherein the branches of the conveying system each comprise at least one conveyor belt forming a circuitous loop which extends in stacking direction of the associated sorting holder and which has a portion leading to the sorting holder, and said portion of the loop leading to the sorting holder being displaceable in stacking direction.

4. An apparatus according to claim 2, wherein the sorting holders form concentric sections of a circle for stacking objects in stacking directions extending along said segments of a circle, the branches of the conveying system that lead to the sorting holders extending from the central area of said segments of a circle to the relevant sorting holders, while said branches can be swivelled about said central area.

5. An apparatus according to claim 1, further comprising:
   a basic module comprising the reading unit, a first one of the sorting holders and a part of the conveying system comprising a recirculation inlet, a recirculation portion connecting to the recirculation inlet, a first one of the switches, two branches connecting to the first switch, of which one branch leads to a sorting outlet and the other branch leads to the sorting holder, and one of the object separators which connects to said recirculation portion; and
   at least one sorting module comprising another one of the sorting holders, a part of the conveying system comprising a sorting inlet connecting to the sorting outlet of the basic module, another one of the switches, two branches connecting to said other switch, a recirculation portion and another one of the object separators which connects to said recirculation portion, one of the branches leading to the sorting holder of said sorting module and the other one of the branches leading to a sorting outlet in a position suitable for cooperation with a sorting inlet of a next, identical sorting module, the recirculation portion of the conveying system that forms part of the sorting module extending between a recirculation inlet and a recirculation outlet, the recirculation inlet being provided in a position suitable for cooperation with a recirculation outlet of a next, identical sorting module, while the recirculation outlet connects to the recirculation inlet of the basic module.

6. An apparatus according to claim 5, further comprising a main processor and processors that are each associated with one of the modules and switch units operable by said processors, wherein the main processor is connected with the processors that are each associated with one of the modules for issuing signals indicating for each object fed to the respective module whether said object is to be passed on to a next module, and wherein the processors are each adapted to operate the associated switch in accordance with said signals.

7. An apparatus according to claim 1 further comprising receiving units that can be displaced together with ends of the branches of the conveying system that terminate in the sorting holders, said receiving units comprising a slide that is displaceable, perpendicularly to the stacking direction, between a first position, projecting into the sorting holder, and a second, withdrawn position and a clamp that is displaceable in stacking direction between a first position on the side of the slide facing away from the associated object separator and a second position in an area comprising a portion that is in alignment with the slide and a portion on the side of the slide facing the associated object separator.

8. A basic module for an apparatus for sorting substantially flat objects, such as mail items and documents, comprising: a reading unit, a sorting holder and a conveying system comprising a recirculation inlet, a recirculation portion connecting to the recirculation inlet, a switch, two branches connecting to the switch, of which one branch leads to a sorting outlet and the other branch leads to the sorting holder, and an object separator connecting to the recirculation portion for feeding objects, one by one, from the sorting holder to the recirculation portion.

9. A sorting module for an apparatus for sorting substantially flat objects, such as mail items and documents, comprising: a sorting holder, a conveying system comprising a sorting inlet, a switch, two branches connecting to the switch, a recirculation portion and an object separator connecting to the recirculation portion for feeding objects, one by one, from the sorting holder to the recirculation portion, one of the branches leading to the sorting holder of said sorting module and the other one of the branches leading to a sorting outlet in a position suitable for cooperation with a sorting inlet of a next, identical sorting holder, while the recirculation portion of the conveying system forming part of the sorting module extends between a recirculation inlet and a recirculation outlet, the recirculation inlet being provided in a position suitable for cooperation with a recirculation outlet of a connecting, identical sorting module and the recirculation outlet being provided in a position suitable for cooperation with a recirculation inlet of another connecting, identical sorting module.

10. A method for sorting flat objects, such as mail items and documents, comprising reading information from objects to be sorted;

determining for each object a sorting indication on the basis of the information read from the relevant object;

a first sorting operation wherein for each object one of at least two sorting holders is selected depending on the sorting indication of the relevant object and the objects are each conveyed to the sorting holder selected therefor and stacked in the sorting holders in a stacking direction, always in a position transverse to the stacking direction; and at least one further sorting operation, wherein at least a number of the objects are taken out of the sorting holders again, a sorting holder is selected for each object again and the objects are each conveyed to the sorting holder selected therefor and stacked in the sorting holders in a stacking direction, always in a position transverse to the stacking direction;

wherein at least during the further sorting operation, the objects stacked in the sorting holders are separated and individually recirculated from the sorting holders.

11. A method according to claim 10, wherein displacements of each object to be sorted, after the sorting indication thereof has been determined, are monitored by a data processor system in such a manner that during the sorting operations the position of each object whose sorting indication has been determined is constantly known.

12. A method according to claim 11, wherein, by way of random check, information is read from objects once again and the read information is compared with the information stored in the dataprocessor system concerning the object at the location of the reading unit.

13. A method according to claim 10, wherein objects are led away-in an order corresponding with the sorting indication.

14. A method according to claim 10, wherein during at least one sorting operation the feed of objects from a first one of the sorting holders is interrupted, whereupon objects are fed from another one of the sorting holders, whereupon objects are again fed from said first one of the sorting holders.

15. A method according to claim 14, wherein in each case at least one object is fed alternately from at least two of said sorting holders.

* * * * *